Nov. 1, 1932.  C. BORNMANN  1,885,982
FOCUSING DEVICE FOR CAMERAS
Filed May 20, 1929
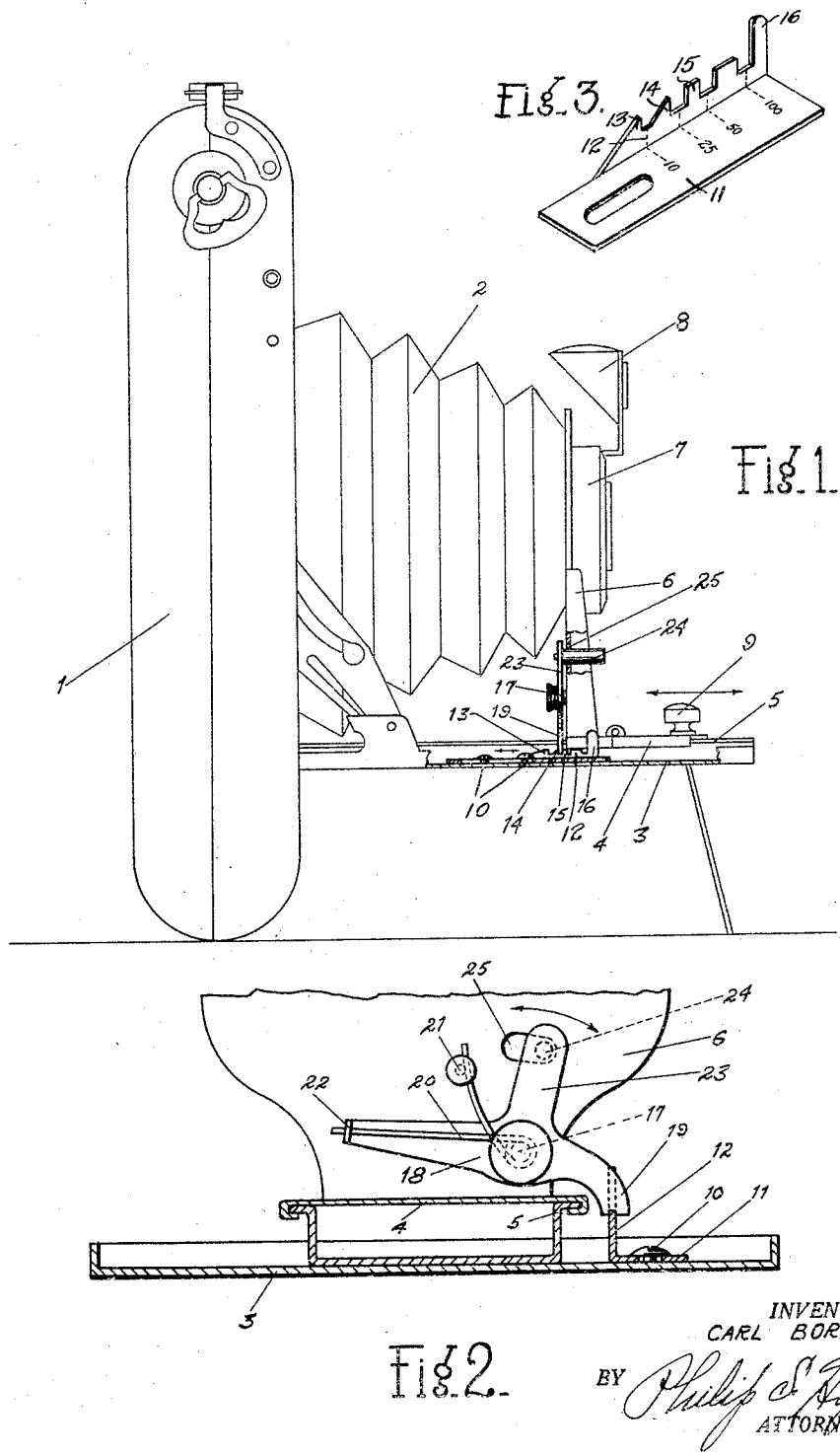
INVENTOR.
CARL BORNMANN.
BY Philip S. Hopkins
ATTORNEY Patented Nov. 1, 1932

1,885,982

UNITED STATES PATENT OFFICE

CARL BORNMANN, OF BINGHAMPTON, NEW YORK, ASSIGNOR TO AGFA ANSCO CORPORATION, OF BINGHAMTON, NEW YORK

FOCUSING DEVICE FOR CAMERAS

Application filed May 20, 1929. Serial No. 364,570.

My invention relates to a focusing device for cameras and has for its primary object the provision of a novel and simple adjusting and locking means for the sliding front of a folding camera upon which the lens and shutter is mounted, whereby the same may be brought and secured in proper focus with relation to the object to be photographed and the plane of the sensitized material within the camera.

One object of my invention is to provide such a focusing and locking device which also provides a part of the finger piece or gripping member by means of which the camera front may be pulled out and pushed back.

A further object of my invention includes the provision of a novel indicator plate provided with predetermined stop members thereon, one of which acts to automatically stop the movement of the sliding front of the camera in one predetermined position of focus.

Other objects and advantages in details of construction and arrangement of parts will be apparent as the description proceeds, reference now being had to the figures of the accompanying drawing forming a part of this application and wherein like reference numerals indicate like parts.

In the drawing:—

Figure 1 is a side view of a folding camera illustrating my invention in operative position thereon, certain parts being in section for clearness.

Figure 2 is a detail rear view of my invention, certain parts being in section and broken away for clearness.

Fig. 3 is a perspective view of a detail on an enlarged scale.

Reference character 1 indicates a conventional folding camera provided with a bellows 2, platform 3, and sliding front 4, slidable upon the rails 5 mounted on the platform 3 and carrying the upstanding vertical supporting frame 6 upon which the shutter 7 and view finder 8 are mounted and to which the front end of the bellows 2 is secured. The sliding front 4 is provided with a finger piece or button 9, affording means for moving the front upon the rails 5.

Suitably secured upon the platform 3, as by the screws 10 adjacent one of the rails 5, is an index plate 11 provided with a vertical flange 12, notched as shown clearly in Figure 3 to provide a series of shoulders or stop lugs 13, 14, 15 and 16. These stop lugs correspond with footage markings on the index plate 11.

Pivoted upon the rear of the vertical frame 6 of the sliding front, as at 17, is a pawl 18 provided with a nose 19 engageable with the notched flange 12 of the index plate 11. A coil spring 20 encircles the pivot 17 and is anchored at one end to the pin 21 rigid with the frame 6 and engages at its opposite end as at 22 with the pawl 18 whereby to normally urge the nose 19 into engagement and contact with the notched flange 12. The pawl 18 is provided with an arm 23, the outer end of which carries a forwardly extending pin 24 projecting through an elongated opening 25 in the frame 6 whereby to provide the second finger piece which, cooperating with the button 9, provides a convenient means for the thumb and forefinger of the operator to grasp and slide the front 4 upon the rails 5. The pin 24 likewise provides a manipulating means for the pawl 18 whereby to rock the same on its pivot for moving the nose 19 into and out of engagement with the flanged index plate.

It will be noted that the first two lugs, namely 13 and 14 on the flange 12 of the index plate, with which the nose 19 of the pawl is adapted to engage as the front is pulled outwardly upon the platform, are bevelled slightly to permit the nose 19 of the pawl to ride thereover if the front is to be pulled outwardly by the button 9 and without rocking the pawl 18 on its pivot by means of the pin 24. The third lug 15, however, is straight sided and stops the nose 19 of the pawl when the same engages thereagainst. This lug 15 is preferably arranged at the point of most universal focus for the lens usually at 25 feet, whereby if an inexperienced operator should grasp the button 9 of the sliding front and pull the front outwardly until it stops and then takes his pictures without regard to a more definite focus, the lens of the camera will not be badly out of focus.

If a finer focusing adjustment is desired, however, the pin 24 may be manipulated to rock the pawl 18 upon its pivot, lifting the nose 19 out of engagement with the index plate whereupon the front may be slid along the rails 5 until the nose 19 is opposite the proper lug or notch on the index plate corresponding to the focus desired, whereupon the pawl may be released to engage with such lug or notch and the front is thus securely locked in proper focusing position.

When it is desired to slide the front back into the camera to the rear of the platform, the pin 24 is manipulated to rock the pawl 18 on its pivot, disengaging the nose 19 from the index plate, whereupon it may be slid rearwardly out of engagement with such index plate.

Of course, changes may be made in details of construction and operation without departing from the spirit and scope of my invention. I do not limit myself, therefore, to the exact structure herein shown and described other than by the appended claims.

I claim:

1. In combination with a camera having a platform and a front slidable thereon, an index plate on said platform having stop lugs thereon at positions of predetermined focus, a lever on said front having a portion normally in the path of said lugs, certain of said lugs permitting the free passage of said portion thereover in one direction and an intermediate one of said lugs preventing the free passage of said portion thereover.

2. In combination with a camera having a platform and a front slidable thereon, an index plate on said platform having stop lugs thereon at positions of predetermined focus, a lever on said front having a portion normally in the path of said lugs, certain of said lugs permitting the free passage of said portion thereover in one direction and an intermediate one of said lugs preventing the free passage of said portion thereover, and means for rocking said lever out of lug engaging postion to permit passage thereof over said last named lug.

3. In combination with a camera having a platform and a front slidable thereon, an index plate on said platform having a flange provided with a plurality of stop lugs thereon in predetermined positions of focus, and means on said front engageable with said lugs when said front is pulled outwardly on said platform, an intermediate one of said lugs acting as a positive stop for said front in fixed position.

In testimony whereo, I affix my signature.

CARL BORNMANN.